CORN HARVESTER

Original Filed Dec. 5, 1963 6 Sheets-Sheet 1

INVENTORS
Robert Ashton,
BY M. Leroy Gullickson, &
James G. Butler
Barnard, McGlynn & Leising
ATTORNEYS

CORN HARVESTER

Original Filed Dec. 5, 1963 6 Sheets-Sheet 2

INVENTORS
Robert Ashton,
BY M. Leroy Gullickson, &
James G. Butler
Barnard, McGlynn & Leising
ATTORNEYS

CORN HARVESTER

Original Filed Dec. 5, 1963 6 Sheets-Sheet 3

INVENTORS
Robert Ashton,
BY M. Leroy Gullickson, &
James G. Butler
Barnard, McGlynn & Leising
ATTORNEYS

CORN HARVESTER

Original Filed Dec. 5, 1963 6 Sheets-Sheet 4

INVENTORS
Robert Ashton,
BY M. Leroy Gullickson, &
James G. Butler
Barnard, McGlynn & Reising
ATTORNEYS

CORN HARVESTER

Original Filed Dec. 5, 1963 6 Sheets-Sheet 5

INVENTORS
Robert Ashton,
BY M. Leroy Gullickson, &
James G. Butler
Barnard, McGlynn & Leising
ATTORNEYS

CORN HARVESTER

Original Filed Dec. 5, 1963 6 Sheets-Sheet 6

INVENTORS
Robert Ashton,
BY W. Leroy Gullickson, &
James G. Butler
Barnard, McGlynn & Reising
ATTORNEYS United States Patent Office Re. 27,554
Reissued Jan. 16, 1973

27,554
CORN HARVESTER

Robert Ashton, Islington, Myron Leroy Gullickson, Scotland, and James G. Butler, Islington, Ontario, Canada, assignors to Massey-Ferguson Limited, Toronto, Ontario, Canada Original No. 3,271,940, dated Sept. 13, 1966, Ser. No. 328,324, Dec. 5, 1963. Application for reissue June 9, 1969, Ser. No. 28,993
Int. Cl. A01d *45/02*
U.S. Cl. 56—105 10 Claims

Matter enclosed in heavy brackets [ ] appears in the original patent but forms no part of this reissue specification; matter printed in italics indicates the additions made by reissue.

ABSTRACT OF THE DISCLOSURE

*Combine corn head attachment having a plurality of corn snapping units mounted on the attachment with some of the units being mounted so that they can be laterally adjusted with respect to adjacent units to accommodate variable spaced crop rows, the mounting providing for continuous support of the units during the adjustment. Power transmitting means are provided to drive the snapping units and which accommodate the lateral adjustment between the units.*

This invention relates to a harvesting attachment adapted to be removably mounted on a combine for simultaneously harvesting a plurality of spaced crop rows and, in particular, to a corn header attachment for a combine particularly characterized by a plurality of harvesting or snapping units, at least some of which are laterally adjustable relative to the others to vary the spacing therebetween in accordance with variation in the spacing between rows of standing corn in a field, the attachment further being readily convertible for harvesting, for example, two, three or four rows of corn.

Referring to corn header attachments for combines by way of example, it will be recognized that such corn header attachments have heretofore been devised and comprise, in general a plurality of snapping units, one for each row of corn to be harvested, arranged in side-by-side relation in accordance with the anticipated spacing between rows of corn to be harvested. Yet more specifically, such snapping units typically comprise a pair of snapping rolls suitably mounted for rotation beside each other on the snapping unit frame, and a corresponding pair of gathering chains carried by the frame of each snapping unit. Power operated drive mechanisms have been provided to power the rotatable snapping rolls and the gathering chains. Thus, as a combine equipped with such a corn header attachment moves through a plurality of spaced rows of corn in a field, the stalks are received between the snapping rolls and the ears of corn are severed therefrom, which ears are then conveyed by the gathering chains and other instrumentalities into the combine.

Therefore, and as will be readily apparent to those acquainted with this art, it is necessary to provide a particular and suitable corn header attachment for the combine in accordance with the number of rows of corn to be harvested and their spacing. In other words, in a two row corn header, a pair of the aforementioned snapping units are provided, and have a lateral spacing in accordance with the anticiapted spacing between the two rows of corn to be harvested. If three rows of corn are to be harvested simultaneously, three snapping units are correspondingly provided, and so on. Thus, it is necessary to provide a particular corn header for each different harvesting application which may differ from each other as to the number of rows of corn to be harvested or the relative spacing of the rows, or both. Furthermore, and equally significantly, problems are encountered in the event that the spacing between the snapping units of a given corn header do not correspond within limits to the spacing between the rows of corn. In other words, irrespective of the number of rows of corn to be harvested simultaneously, it is essential that the lateral spacing of the number of snapping units provide on the header be such as to insure that only one row of corn will be received by a given snapping unit, and that no row will be missed as by passing between any two adjacent snapping units.

In view of the foregoing considerations, the present invention is directed to a harvesting attachment adapted to be removably mounted on a combine for simultaneously harvesting a plurality of spaced crop rows and, in particular, to a corn header attachment for multiple rows of standing corn, and which attachment is characterized by a main frame removably mountable on a combine so as to extend generally laterally of the latter and its path of travel through a field, a harvesting or snapping unit for each crop row or row of corn, means for mounting such units in laterally spaced relation on the main frame of the attachment in accordance with the spacing of the crop rows or rows of corn, the mounting means for at least one of the units permitting lateral adjustment of the latter relative to an adjacent unit to vary the lateral spacing therebetween in accordance with the actual spacing occurring between rows in any given field being harvested to insure that each unit will receive only one crop row or row of corn and that no row will be missed, and power operated means for driving the harvesting or snapping units to harvest the crop concerned and including power driven means interconnecting the aforementioned laterally relatively adjustable adjacent units to permit variation in the lateral spacing thereof while, at the same time, providing a power connection therebetween.

In this regard, the invention is more specifically characterized by a corn header attachment for a combine, which header attachment includes a main frame means adapted to be removably mounted on the combine and including a support beam or tool bar extending laterally of the combine and the path of travel of the latter, a plurality of snapping units each including a unit frame mounting a pair of rotatable snapping rolls and a pair of gathering and elevating chain constructions, means mounting each of the unit frames in laterally spaced relation on the aforementioned support beam or tool bar with the mounting means for at least one of the unit frames permitting lateral adjustment of the latter relative to an adjacent unit frame to vary the lateral spacing therebetween, and power operated means for driving the snapping rolls and chain constructions of such adjacent pair of units and including a pair of coupling means for adjustably coupling in driving relation the respective snapping rolls and chain constructions of the adjacent units, whereby the relative lateral spacing of the plurality of snapping units may be varied in accordance with the particular spacing between a plurality of rows of corn in a given field while readily maintaining power drive to the snapping units.

More specifically in this regard, the invention is further characterized by a novel hood panel and snout assembly extending laterally between an adjacent pair of relatively adjustable snapping units for the purpose of aiding in directing stalks of corn into the units during the harvesting operation and preventing ears of corn from falling from the header, and which assemblies are characterized by at least a pair of panel members respectively mounted on adjacent units, and means adjustably connecting such panel members for relative lateral movement therebetween to accommodate variation in the lateral spacing of adjacent snapping units as the spacing of the latter is adjusted.

The invention is further characterized by a novel support and drive mechanism for the pair of snapping rolls aforementioned of each snapping unit, and comprising means mounting spaced portions of each snapping roll of each pair thereof for relative angular adjustment relative to each other and the unit frame on which they are mounted, one end of each snapping roll of each pair thereof being provided with a bevel gear, and a single power driven drive gear having double bevel faces being interposed between and meshing with the faces of the aforementioned driven bevel gears of a given pair thereof to rotatably drive the snapping rolls. As a result, in the event of wear on the drive faces of the aforementioned gears or, alternatively, due to variation in the particular size of the crop to be harvester, by way of example, the angular inclination of the snapping rolls may be adjusted to increase or decrease the spacing therebetween while such rolls are still operatively drivingly connected to the double faced bevel drive gear.

At this juncture, it may also be noted that the present invention is preferably embodied in a four row corn header attachment characterized by four of the aforementioned snapping units, the middle two units of which may be fixed laterally relative to each other on the main frame or support beam or tool bar of the attachment, while the outer two units are laterally adjustable relative to an adjacent one of the two middle units. As a consequence, the aforesaid outer two snapping units may be adjusted laterally relative to the adjacent ones of the middle two snapping units to vary the lateral spacing therebetween in accordance with the actual spacing occurring between rows in any given field being harvested to insure that each snapping unit will receive only one crop row and that no row will be missed. However, due to standardization of the respective snapping units, components thereof and the power driven means for drivingly interconnecting adjacent snapping units as will appear more fully hereinafter, two and three row harvesters may be readily provided. In other words, two and three row header attachments may be provided in which two or three, respectively, of the aforementioned snapping units may be mounted in laterally spaced relation on the main frame or support beam or tool bar of the attachment in the manner aforementioned, and be connected to a source of power to drive the respective snapping rolls and chain constructions thereof.

A preferred embodiment of the invention will now be described with reference to the drawings in which.

Figure 1:
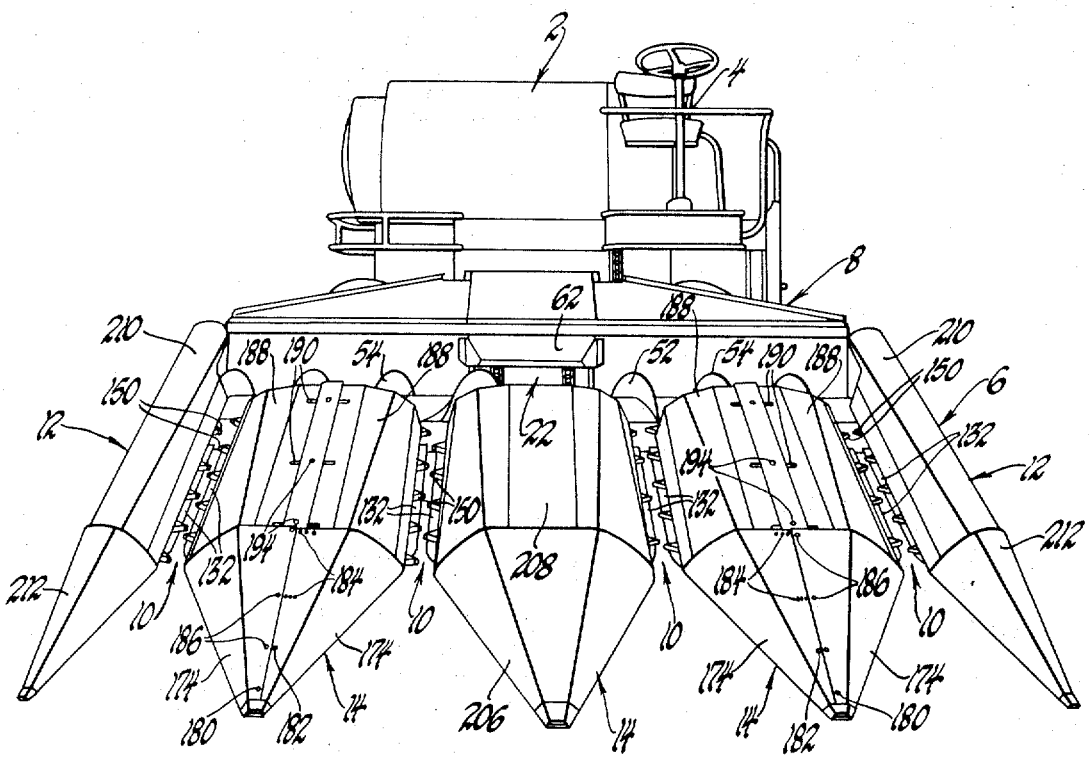
FIGURE 1 is a front end view of a combine equipped with a preferred embodiment of the harvesting attachment of the present invention, in this case, a four row corn header attachment.
Figure 4:
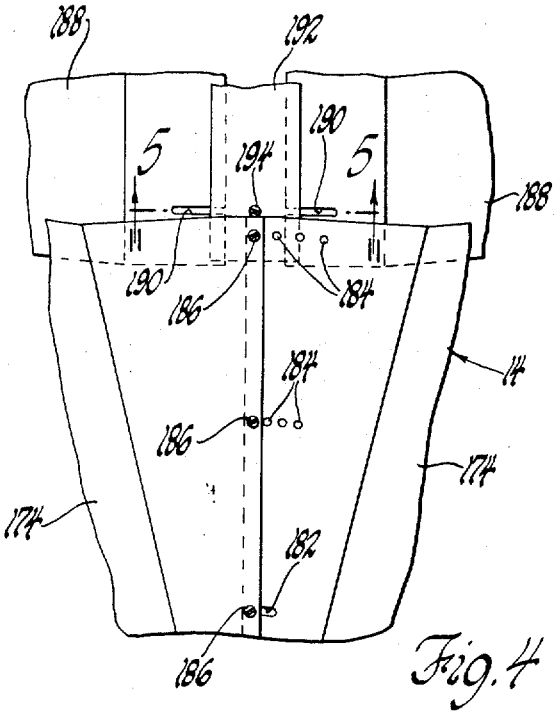
FIGURE 4 is an enlarged fragmentary top plan view of laterally adjustable hood and snout assemblies associated with each of the outermost pairs of snapping units of the header illustrated in FIGURE 1.
Figure 5:
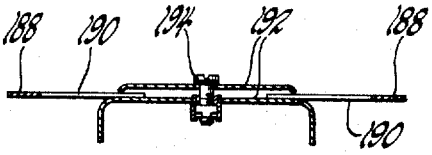
FIGURE 5 is a sectional view taken on line 5—5 of FIGURE 4.
Figures 2, 3:
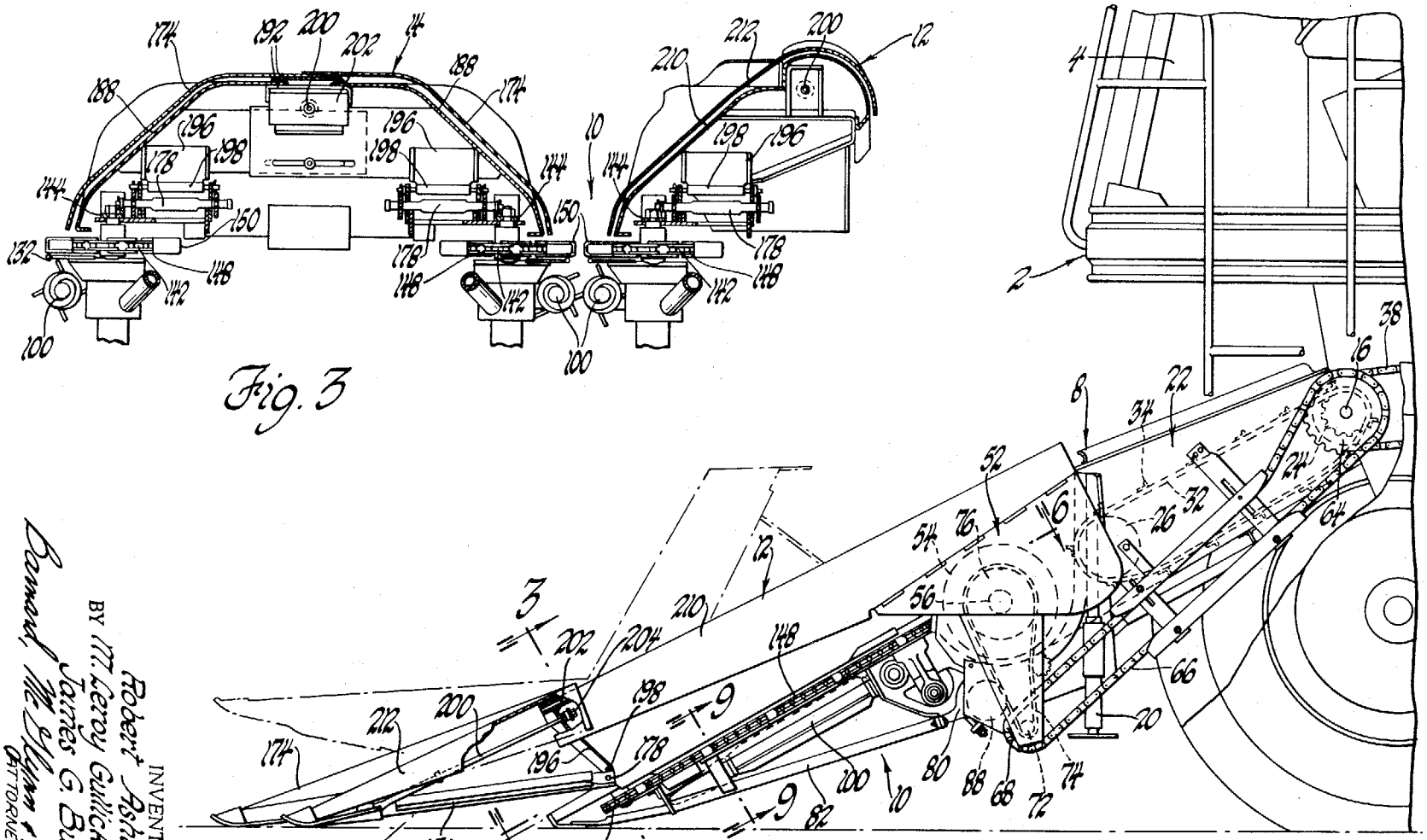
FIGURE 2 is a fragmentary enlarged side elevational view of the apparatus of FIGURE 1 taken from the right side thereof, partly in section and partly broken away to illustrate certain details of the construction.
FIGURE 3 is an enlarged fragmentary sectional view taken on line 3—3 of FIGURE 2, and illustrating certain details of one of the outside snapping units and part of an adjacent middle unit.
Figure 7:
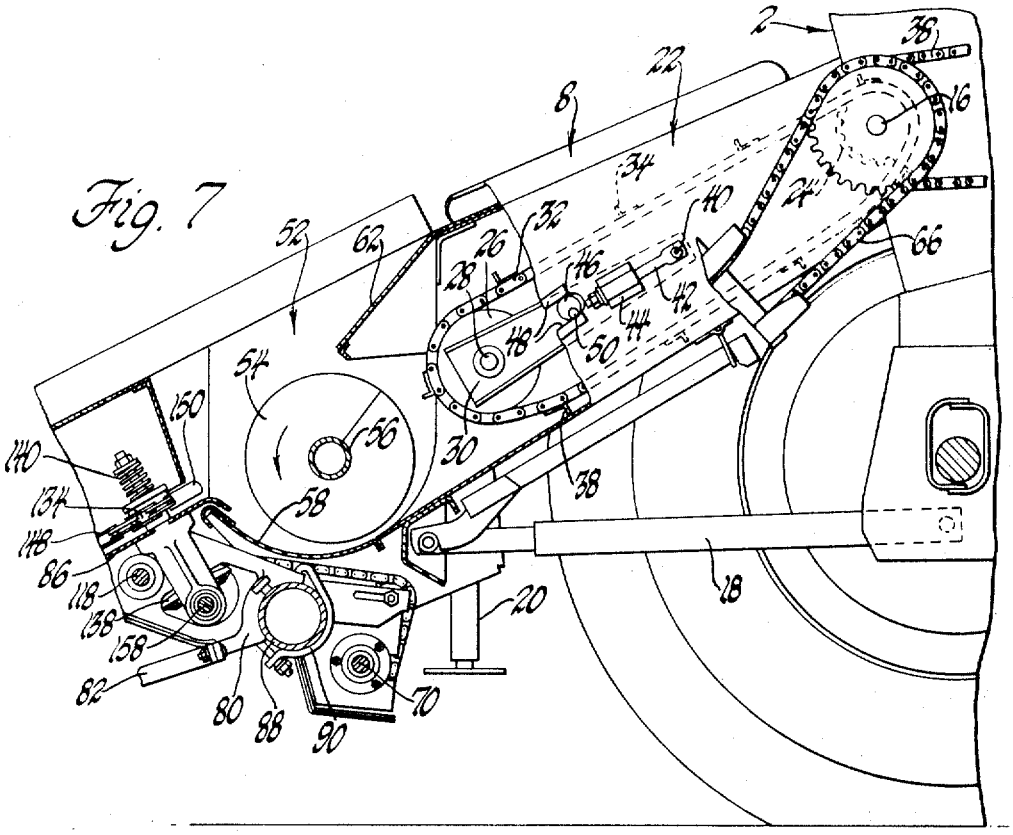
FIGURE 7 is a view corresponding generally to FIGURE 2 but being fragmentary in nature, enlarged, partially in section and taken in a slightly different plane than that of FIGURE 2, to illustrate certain details of the header.
Figure 8:
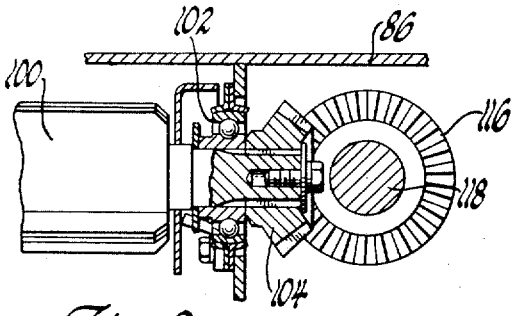
FIGURE 8 is an enlarged sectional view taken on line 8—8 of FIGURE 6.
Figure 9:
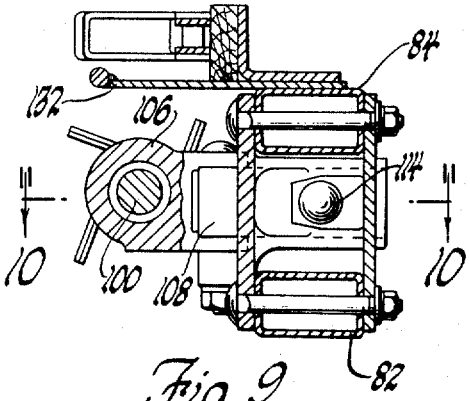
FIGURE 9 is an enlarged sectional view taken on line 9—9 of FIGURE 2.
Figure 10:
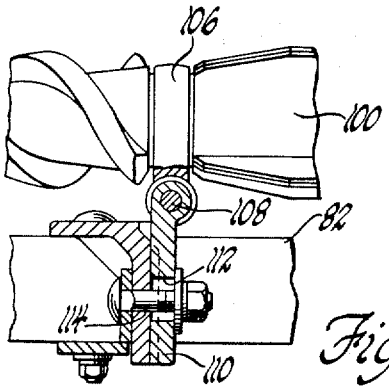
FIGURE 10 is a sectional view taken on line 10—10 of FIGURE 9.

Referring now to the drawings, and particularly FIGURES 1, 2 and 7 thereof, the numeral 2 generally indicates a self-propelled combine of suitable construction and including an operator's station 4 at the extreme forward end thereof, while the numeral 6 generally indicates a four row corn header attachment for harvesting four rows of corn simultaneously, which attachment comprises a main frame indicate at 8, four snapping units, one for each corn row, indicated at 10, outside hood and snout assemblies 12 extending along an outside portion of the outside snapping units, and hood and snout assemblies 14 extending between and overlying adjacent pairs of the snapping units to facilitate feeding stalks of corn to the snapping units, while further insuring that harvested corn will not be lost over the sides or back of the header attachment. As will be apparent from FIGURE 1, and as will be described more fully hereinafter, the attachment is mounted on a forward portion of the combine 2 so as to extend laterally of the forward path of travel thereof, and immediately below the operator's station 4 to provide the operator with an excellent view of the various instrumentalities of the header attachment.

Figure 14:
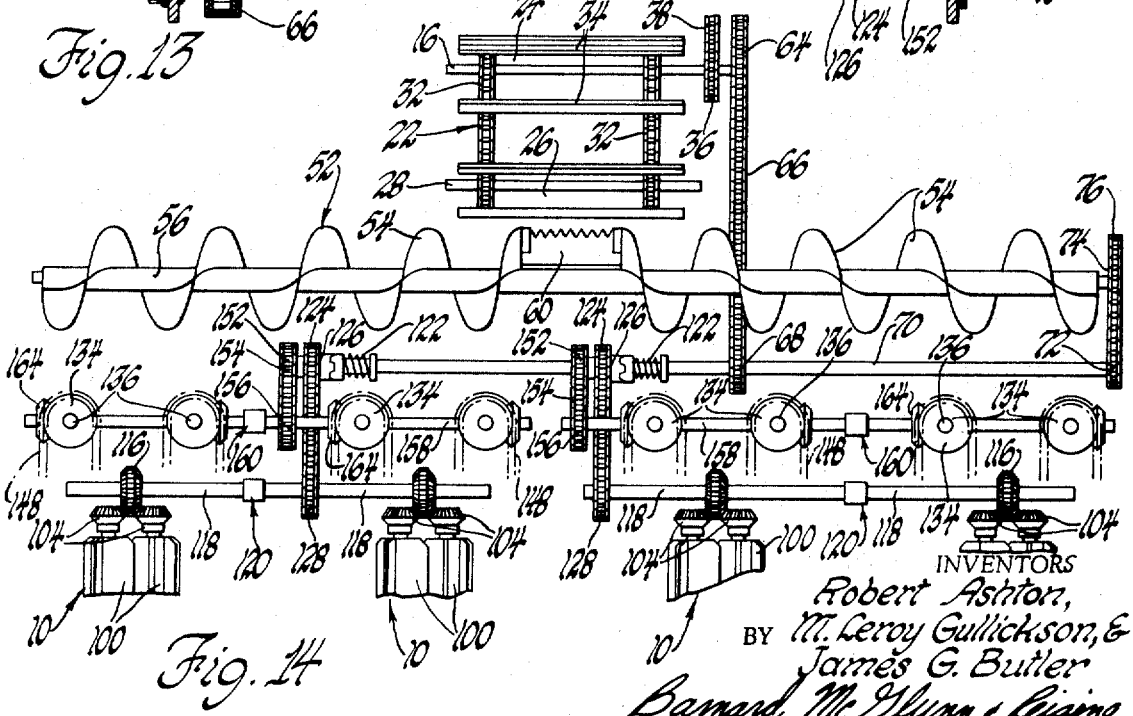
FIGURE 14 is a schematic illustration of the power drive transmission for driving various instrumentalities of the header.

Referring now particularly to FIGURES 2, 7 and 14, the rearmost end of the header attachment 6 is provided with suitable coupling means of conventional construction, hence not specifically illustrated, for removably mounting the header attachment to the forward portion of the combine as aforementioned. Suffice it to say that such a conventional mounting means mounts the attachment for relative pivotal movement in a vertical plane relative to the combine and ground for movement between a lowered harvesting position and a raised transport or parking position about an axis substantially coincident with the axis of the shaft 16. A suitable number of hydraulically operated jacks 18 are operatively connected between the frame of the combine 2 and the main frame 8 of the header attachment, as illustrated in FIGURE 7, for the purpose of controlling movement of the attachment between its positions as aforementioned, while a suitable number of conventional parking jacks 20 are carried by the main frame of the header attachment for parking purposes as will be readily appreciated by those acquainted with the art.

Referring now further particularly to FIGURES 2, 7 and 14, an undershot conveyor assembly indicated generally at 22 is carried by the main frame 8 of the header attachment, and comprises a sprocket 24 carried by the rotatable drive shaft 16 aforementioned and a drum 26 carried on an idler shaft 28 rotatably mounted on laterally spaced arms 30 which, in turn, are suitably mounted on the main frame 8 for rectilinear and pivotal movement to vary the spacing between the drum and sprocket and the vertical position of the drum 26 to adjust the conveyor for different size crops. A plurality of conveyor chains 32, herein shown to be two in number, are entrained about the respective drum and sprocket and have secured thereto a plurality of conveyor paddles 34. The shaft 16 mounts a drive sprocket 36, FIGURE 14, driven through a drive chain 38 from a suitable source of power carried by the combine as will be readily apparent. As a consequence, the sprocket 24 drives the conveyor while the drum 26 idles.

Referring to the aforementioned adjustment of the idler drum 26, and with particular reference to FIGURE 7, each of the arms 30 may be pivotally connected as illustrated at 40 to a rod 42 telescopically movable through a bracket 44 fixedly secured to the housing structure enclosing the conveyor 22 and forming a part of the main frame of the header attachment. In addition, a circular bearing member 46 is slidably mounted in a somewhat elongated trackway 48 for movement generally along the axis of the rod 42, the member 46 carrying eccentrically a pin 50 connected to the respective arms 30. As a consequence, axial shifting movement of the rods 42 within their brackets 44 to a particular position as determined by the nuts associated with the rods as shown will result in adjustment of the tension of the chains 32 between the drums 24 and 26. In addition, rotation of the member 46 within its trackway will result in the eccentric pins 50 carried thereby pivoting the arms 30 upwardly or downwardly about the connections 40 to adjust the vertical height of the conveyor assembly with respect to its enclosing housing. The member 46 may be adjusted rotatably in various fashions such as, for example, a lever arm secured thereto.

Referring now particularly to FIGURES 2, 6, 7 and 14, the main frame of the header attachment is further provided with cross auger conveying means indicated generally at 52 and comprising the two opposed auger flights 54 securred to the laterally extending rotatable auger drive shaft 56 and disposed within the auger trough 58 having an open top and extending transversely of the header attachment immediately in front of the conveyor assembly 22. As will be readily apparent, the two opposed auger flights, with the latter rotating counterclockwise in FIGURE 7, are adapted to feed ears of corn conveyed thereto in a manner to be described toward the center of the auger means where a paddle 60 is formed joining the two auger flights immediately in front of the mouth of the conveyor assembly 22, a hood 62 also being provided so as to extend from the top of the conveyor housing toward and to a point immediately adjacent to the auger means and the central paddle 60 thereof.

Referring particularly to FIGURES 2, 11, 13 and 14, power for driving the auger drive shaft 56 is provided from the conveyor drive shaft 16 previously described, such shaft being provided with a sprocket 64 connected though the drive chain 66 to a sprocket 68 carried by the laterally extending main rotatable drive shaft 70 for the snapping units 10. A sprocket 72 carried by such main drive shaft 70 is connected through drive chain 74 to sprocket 76 fixed to the auger drive shaft 56, and also engaging the drive chain intermediate sprockets 72 and 76. As a result, the auger shaft 56 is rotated counterclockwise in FIGURE 7 so that the auger flights will convey harvested ears of corn into the mouth of the undershot conveyor assembly 22.

Figure 11:
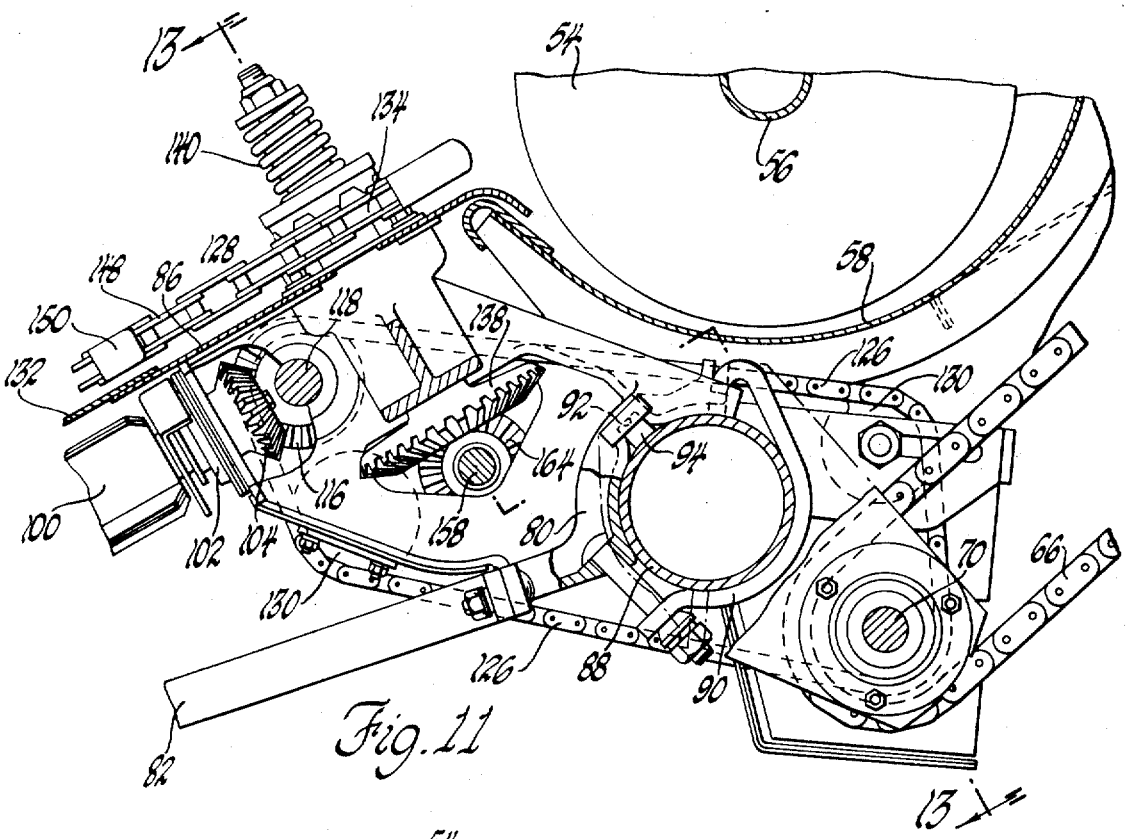
FIGURE 11 is an enlarged fragmentary sectional view taken on line 11—11 of FIGURE 6.
Figure 12:
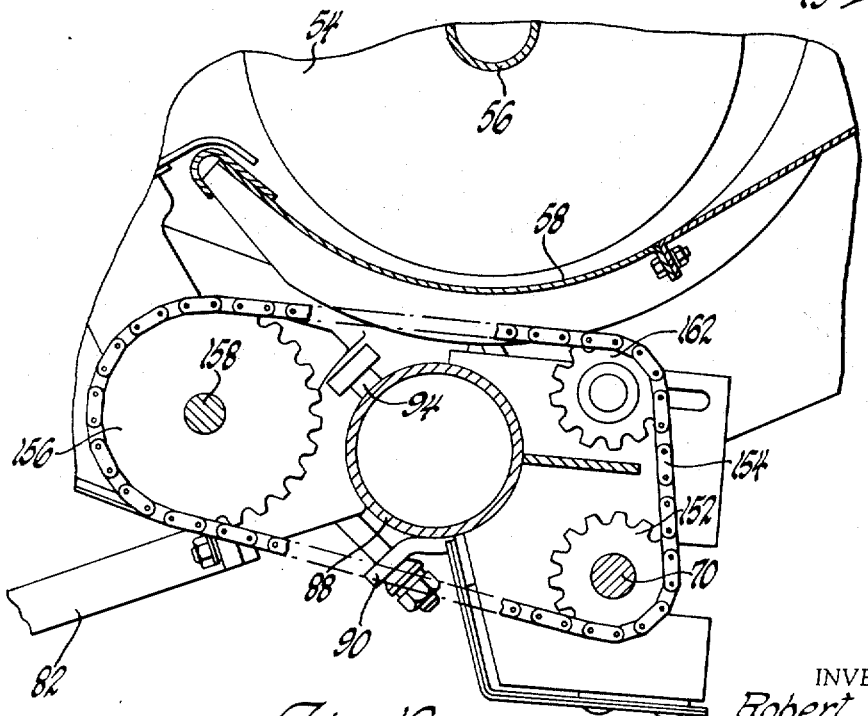
FIGURE 12 is an enlarged fragmentary sectional view taken on line 12—12 of FIGURE 6.
Figure 13:
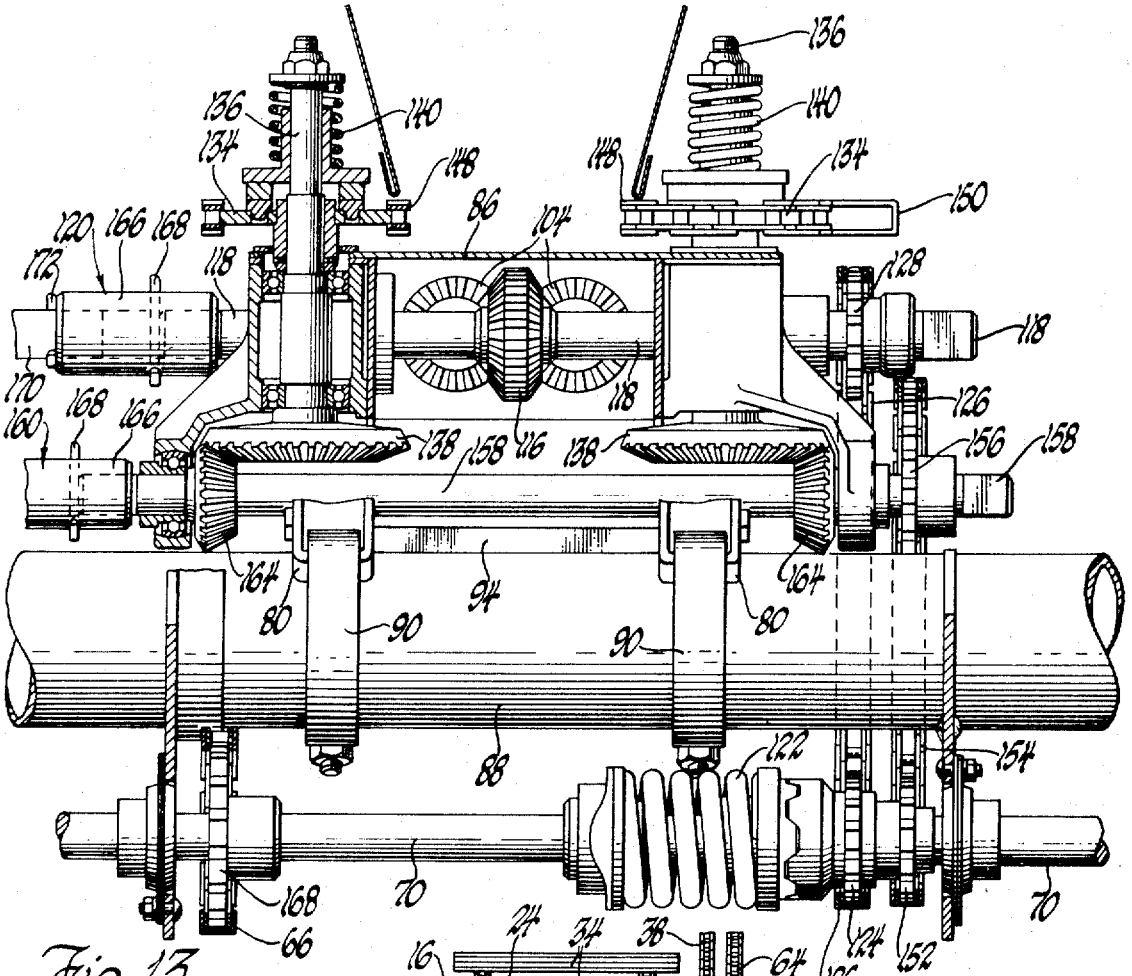
FIGURE 13 is a fragmentary sectional view taken along line 13—13 of FIGURE 11.

Referring now to the construction of the snapping units 10, it may be first observed that they are substantially identical. Thus, and referring particularly to FIGURES 2, 6, 9, 11 and 13, it may be seen that each snapping unit comprises a rigid frame including a pair of laterally spaced saddle members 80 respectively rigidly secured to laterally spaced elongated lower beams 82 which, in turn, are suitably rigidly secured at their forward ends to corresponding elongated upper beams 84 having their opposite ends suitably rigidly secured to a mounting plate 86 also rigidly connected to the lower beams 82. The saddle members 80 of each snapping unit are of suitable annular curvature for seating on a corresponding portion of a laterally extending elongated support beam or tool bar 88 which is circular in cross section and is suitably fixedly secured on the main frame of the attachment. Auxiliary bracket or strap members 90 are attachable to and cooperate with the respective saddle members 80 of each snapping unit to tightly mount the latter to the beam or bar 88. In this regard, and referring particularly to FIGURES 11 and 13 illustrating one of the two center snapping units 10; that is, the third snapping unit from the left in FIGURE 1 which is the right-hand most snapping unit of FIGURE 6, it may be seen that the saddle members 80 for the two middle units include notches or recesses 92 to receive the opposite ends of the key bars 94 suitably rigidly secured to the beam or bar 88. The position of the key bars 94 circumferentially of the support beam or tool bar is such that, once the middle two snapping unit frames are securely mounted respectively thereto, the frames have the proper angular attitude relative to the beam or bar 88 and to the rest of the header attachment structure for harvesting purposes. In addition, the cooperation between the saddle members 80 of each of the middle two snapping units and their key bars 94 is such as to maintain such middle snapping units in predetermined laterally spaced positions relative to the tool bar or support beam and each other.

Figure 6:
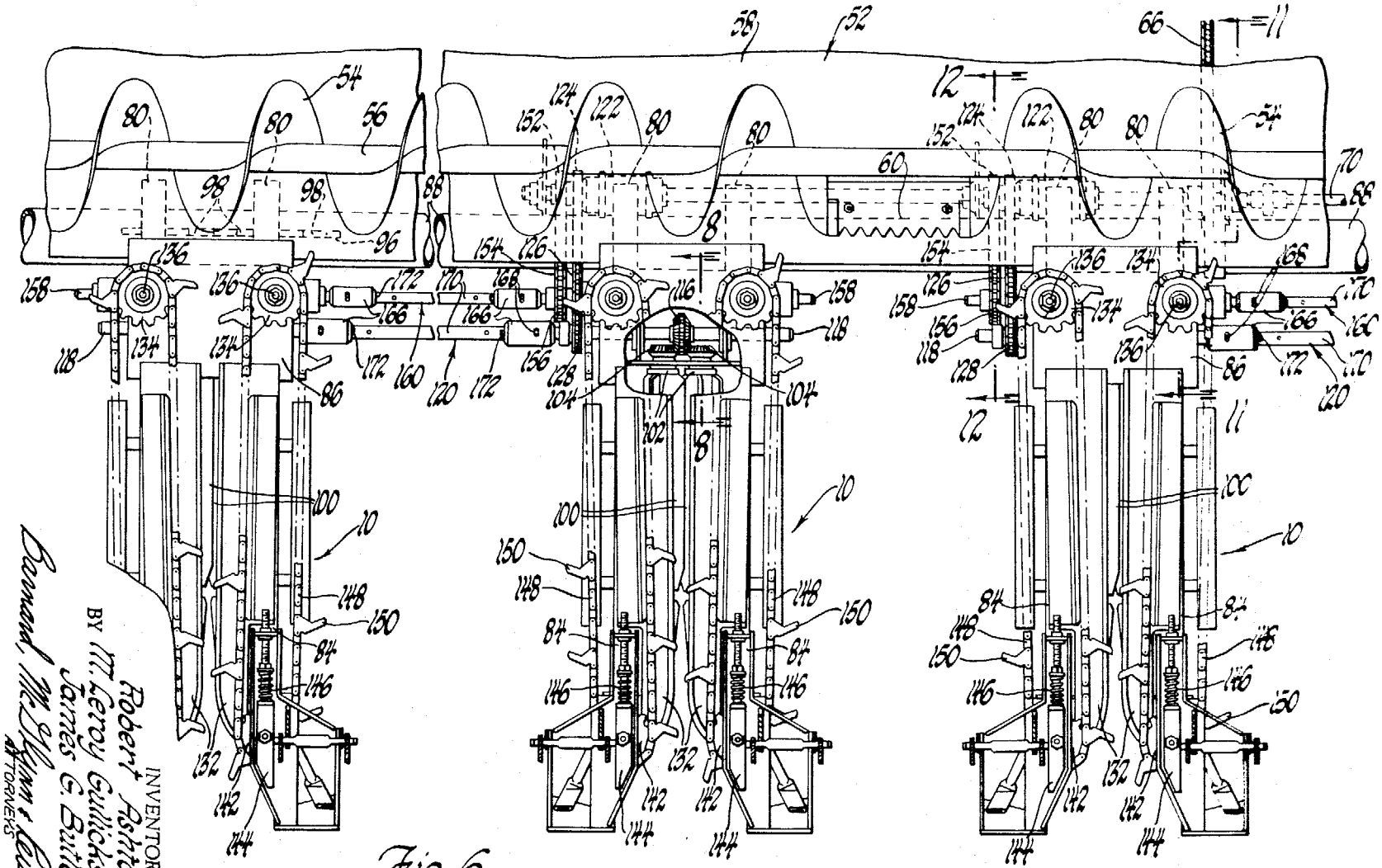
FIGURE 6 is an enlarged fragmentary sectional view taken on line 6—6 of FIGURE 2 illustrating, viewing the figure from left to right, one outside snapping unit and the two middle units of the four row header.

At this juncture, it should be observed that the foregoing description pertains only to the middle pair of snapping units; that is, the second and third units from the left in FIGURES 1 and 6. On the other hand, while corresponding key bars are provided for the outside snapping units, one such bar being illustrated in FIGURE 6 at 96, these key bars include means providing for laterally adjusting the position of the associated snapping unit along the support beam or tool bar and relative to an adjacent one of the center two snapping units. Thus, and referring to FIGURE 6, the extreme leftward snapping unit, which is an outside snapping unit, is illustrated as secured to the tool bar in substantially the same manner as the other two snapping units illustrated in FIGURE 6 and as aforedescribed. However, the key bar 96 in this instance is provided with notches or spaces 98 of sufficient width and spacing to receive the saddle members 80 and the associated snapping unit upon adjustment of the latter to different lateral positions relative to the adjacent snapping unit.

At this juncture, while the center two snapping units have been disclosed as being mountable in fixed positions laterally relative to each other and the support beam or tool bar, it will be readily apparent that the key bars 94 associated therewith may likewise include notches or other means providing for their adjustment laterally. However, it has been found that mounting the center two snapping units with a fixed lateral spacing relative to each other while having the outer two snapping units laterally adjustable provides sufficient flexibility in spacing of the snapping units in accordance with variation in spacing of rows of corn being harvested simultaneously.

Each snapping unit further comprises, with particular reference to FIGURES 2, 6 and 8 through 14, a pair of elongated multiple-bladed or fluted snapping rolls 100 arranged in side-by-side relation and extending longitudinally of the associated frames of each snapping unit. One end portion of each snapping roll is rotatably supported in a spherical bearing construction 102, in and of itself of conventional construction, suitably carried by the mounting plates 86 of the snapping unit frames, a bevel face gear 104 being connected to each such roll adjacent such spherical bearings for rotatably driving the roll in a manner to be described. Another portion of each roll, remotely forward from the bearings 102, is suitably rotatably supported in a bearing 106 connected by a hinge 108 to an adjustment plate 110 having an aperture 112 therein of greater diameter than that of a fastener 114 which extends therethrough and connects the adjustment plate to the unit frame as illustrated paricularly in FIGURES 9 and 10. Thus, the fasteners 114 of a given snapping unit may be loosened and the associated snapping rolls adjusted angularly and laterally relative to each other and their snapping unit frames generally about axes respectively extending through the centers of the spherical bearings 102 and normal to the longitudinal axes of the rolls.

Each pair of snapping rolls of each snapping unit is adapted to be power driven from a single associated double face bevel drive gear 116, respectively meshing with the bevel gears 104 of each such pair and carried by four coaxial roll drive shafts 118 suitably rotatably supported on the snapping unit frames. Furthermore, and with particular reference to FIGURES 6, 13 and 14, it will be noted that the roll drive shafts 118 for each outermost snapping unit 10 and the adjacent inner unit are drivingly interconnected by a coupling mechanism indicated generally at 120 and to be described more fully hereinafter, there being no such drive coupling directly between the middle pair of snapping units. As aforementioned, the chain 66 drives the main snapping unit drive shaft 70 which includes a pair of spring biased clutch assemblies 122 normally clutchingly engaging hubs rotatable about shaft 70 and carrying drive sprockets 124 respectively having chains 126 entrained thereabout and about associated sprockets 128 secured to one of the roll drive shafts 118 of each interconnected pair thereof to drive such roll shafts and, through the coupling mechanisms 120, the associated roll drive shaft of each pair thereof. In addition, rotatable idler sprockets 130 also engage chains 126. Thus, power is transmitted through the double face bevel gears 116 to drive each associated pair of snapping rolls 100 and, in the event of an overload occurring as the snapping rolls function, the clutch assembly 122 affected will automatically disengage to interrupt the transfer of power from main drive shaft 70 to the snapping rolls in question.

Each snapping unit further comprises a pair of elongated stripper plates 132, as illustrated particularly in FIGURES 1 and 6, respectively generally overlying and extending along each one of the associated pair of snapping rolls 100. With particular reference to FIGURES 6, 11, 13 and 14, it may be seen that each unit further comprises a pair of laterally spaced drive sprockets 134 suitably rotatably mounted freely about the axis of the rotatable shafts 136 carrying the bevel face drive gears 138, a spring-biased preferably shielded clutch member 140 being provided at the upper ends of such shafts for normal clutching engagement with the sprockets 134 to drive the latter as the shafts 136 rotate. A corresponding pair of idler sprockets 142 are suitably rotatably mounted on the respective carriages 144 in turn adjustably mounted on the unit frames generally above each of the stripper plates 132, the carriages being spring-biased adjustably by the mechanism illustrated at 146 in FIGURE 6 to continuously bias the idler sprockets away from their associated drive sprockets 134. A gathering and elevating chain 148, including the spaced pick-up fingers 150, is entrained about each pair of drive and idler sprockets aforedescribed.

Referring particularly to FIGURES 6 and 11 to 14, in order to drive the bevel gears 138 and shafts 136 aforedescribed, the main snapping unit drive shaft 70 is coupled through a pair of sprockets 152 carried thereby and chains 154 entrained thereover to corresponding sprockets 156 carried by one each of two pairs of coaxial gathering chain drive shafts 158 suitably rotatably mounted on the main frame and interconnected by a coupling mechanism indicated generally at 160 in FIGURES 6, 13 and 14 in a manner similar to the connections of the roll drive shafts 118. Idler sprockets 162 also mesh with the respective chains 154. It is to be noted that the gathering and elevating chains 148 of each of the outer snapping units is drivingly associated with its adjacent unit as is the case with the snapping rolls, there being no drive connection between the middle pair of snapping units as will be clearly apparent from FIGURE 14. Thus, drive is transmitted from a main snapping unit drive shaft 70 through the chains 154 to the gathering chain drive shafts 158 and the bevel gears 164 carried thereby which mesh with the gears 138 on shafts 136. As a result, the shafts 136 carrying the drive sprockets 134 are power driven to drive the gathering and elevating chains, it being understood that the clutch mechanisms 140 will function automatically to disengage the drive sprockets 134 from shafts 136 in the case of an overload, thereby interrupting drive to the gathering chains affected.

The coupling mechanisms 120 and 160 which respectively interconnect the adjacent pairs of coaxial roll drive shafts 118 and gathering chain drive shafts 158 as aforedescribed are substantially identical in construction, and the details of which are shown best in FIGURES 6 and 13. Thus, these coupling mechanisms each comprise a pair of collar or coupling sleeves 166 having internal bores of a suitably polygonal cross section, in this case square. Such collars or sleeves are adapted to receive respectively the axially opposed ends of each associated pair of roll drive or gathering chain drive shafts as the case may be, the ends of such shafts likewise being of square cross section for rotation with the collars or sleeves. Cotter pins 168, set screws or the like extend through each collar or sleeve to removably mount the latter on their associated shafts. A coupling shaft 170, likewise of square cross section, extends between and is received within the bores of each pair of coupling collars or sleeves so that drive may be transmitted between the axially aligned associated pairs of roll drive shafts 118 and gathering chain shafts 158. A plurality of axially spaced apertures are provided in opposite ends of each coupling shaft to removably receive a cotter key 172 or similar means to hold each coupling shaft in position between its associated collars or sleeves. It will be noted, particularly from FIGURE 13, that the lengths of the bores of each coupling collar or sleeve are sufficiently great relative to the lengths of the coupling shafts and the range of lateral adjustment between adjacent associated pairs of snapping units 10 to provide an axial lost motion connection between opposed coupling collars or sleeves; that is, an outside unit may be moved toward and away from its adjacent unit within limits, such movement being accommodated by the lengths of the bores of the associated coupling sleeves and, in any given position of lateral relative adjustment of such units, the cotter keys 172 may be inserted in the suitable apertures in the coupling shafts to hold the latter in position between its associated coupling collars or sleeves.

Thus, the coupling mechanisms 120 and 160 permit relative lateral adjustment within certain limits of the associated pairs of snapping units 10 as aforedescribed, while still providing an operative power connection therebetween in adjusted positions thereof. However, it is possible that the range of drive adjustment afforded by coupling shafts 170 of a given length may be inadequate under certain operating conditions to accommodate a desired spacing between the laterally adjustable snapping units; that is, a given coupling shaft may be too long to accommodate a relatively narrow spacing or too short for a relatively wide spacing. Thus, and in such an event, the coupling shafts may be provided in varying lengths to give a complete range of adjustment from the narrowest to the widest. In this regard, it will be readily apparent that the coupling sleeves 166 may be readily removed from shafts 118 or 158 as the case may be to demount a given coupling shaft for replacement by another of different length.

Referring now particularly to FIGURES 1 through 5, it will be noted that the aforementioned hood and snout panel assemblies 12 and 14 are provided in association with the snapping units 10 for the usual purpose of facilitating direction of a given row of corn between the snapping rolls and gathering and elevating chains of each snapping unit, while preventing loss of harvested ears of corn over the sides of the header attachment or the back thereof as will be readily appreciated by those acquainted with this art. However, the hood and snout panel assemblies 14 located respectively on either side of the middle assembly as viewed in FIGURE 1; that is, the assemblies which span laterally between each outside snapping unit and its adjacent unit, are particularly constructured in a novel manner to accommodate adjustment of the relative lateral spacing between such adjacent units.

Thus, it may be observed that the snout portion of each such assembly includes a pair of panel members 174 having overlapping side edges, and each of which is respectively hingedly connected through the arms 176 to the hinges 178 respectively carried by adjacent snapping unit frames. The forward ends of the side edges of the panel members are pivotally connected at 180, while the side edge of one panel member is provided with an elongated slightly arcuate slot 182 and a plurality of arcuately aligned apertures 184 respectively cooperable with fasteners 186 carried by the side edge of the other panel member to connect the panel members together. In similar fashion, each of the hood portions of such assemblies includes a pair of panel members 188 provided with opposed elongated slots 190 in side edges thereof sandwiched between over and underlying panel members 192 having a suitable number of fasteners 194, corresponding to the number of the aforementioned slots and in this case three in number, extending therebetween. Each of the hood panel members are secured through brackets 196 to hinges 198 carried by respective ones of the adjacent snapping unit frames immediately adjacent the hinges 178 for the snout panel members. A rod 200 is suitably secured to the snout panels, extends through a panel 202 secured to the hood panels, and is provided with an adjustable nut 204 to adjust the relative angular disposition of the snout and hood panel assemblies under the influence of gravity, while permitting raising pivotal movement thereof for access to the snapping units as will be readily apparent.

As a result of this construction, the widths of the snout and hood portions of the aforedescribed assemblies 14 may be increased or decreased in accordance with the relative lateral spacing of each of the outer snapping units relative to the unit adjacent thereto. Thus, when an outer unit is to be moved inwardly toward the adjacent unit as viewed in FIGURE 1, fasteners 186 may be loosened or removed and the adjacent side edges of the respective panel members 174 of the snout portion pivoted at 180 and telescoped together to a shorter width as the snapping units are so adjusted, the fasteners then being retightened or replaced in slot 182 and particular apertures 184. Naturally, the opposite operation takes place when it is desired to widen the width of the snout. By the same token, merely by loosening the fasteners 194, the panel members 188 of the hood portion may be moved toward or away from each other to accommodate variation in spacing of the adjacent snapping units, the fasteners thereafter being tightened to hold the panels in any adjusted position. Furthermore, the amount of adjustment of any one panel member 174 or 188 relative to its associated panel member is minimized for any given adjustment of spacing between adjacent snapping units. In other words, if an outer snapping unit is to be moved three inches closer to an adjacent snapping unit, it will be manifest that the respective panel members need only be moved one and one-half inches each to accommodate the full three inches of adjustment.

It will, of course, be appreciated that the middle and two outermost hood and snout assemblies 14 and 12, respectively, are hingedly connected to associated snapping units in a manner similar to those previously described; that is, the snout portion 206 and hood portion 208 of the middle assembly will be hinged exactly as those described to the middle two snapping units while the outer assemblies 12 have their hood and snout portions 210 and 212 hinged entirely to the outermost snapping units by hinges 198 and 178, respectively, with an adjustment rod 200 extending therebetween. It will further be appreciated that the middle and outermost hood and snout assemblies are not shown as including the adjustment features as aforedescribed since, of course, the middle two snapping units spanned by the middle panel assembly are held in a laterally fixed spaced relationship as specifically disclosed and, of course, the outermost hood and snout assemblies will be adjusted bodily with the respective snapping units with which they are connected. However, in the event that it is desired to mount the middle pair of snapping units for lateral adjustment relative to each other in the manner of the outer snapping units, or merely for standardization of parts, it will be appreciated that the hood and snout assembly 14 spanning the inner pair of snapping units may be constructed exactly as the assemblies to either side thereof and as aforedescribed.

In operation, it will now be appreciated that the outermost two snapping units 10 may be laterally adjusted on the support beam or tool bar 88 relative to the adjacent snapping units by mounting the saddle members 80 on the support beam in any selected pair of notches or spaces 98 on the associated key bars 96, the notches being spaced at a suitable distance to provide the range of adjustment desired in the increments desired. Naturally, the range and increments of adjustment will be correlated to the spacing between the inner pair of snapping units if they are held in laterally fixed relation as herein specifically disclosed. In the embodiment shown, it is considered desirable to mount the two center snapping units on centers of approximately thirty-nine inches with the key bars 96 associated with the outer snapping units accommodating adjustment thereof for row widths from thirty-six inches to forty-two inches, the hood and snout assemblies 14 associated therewith being likewise adjustable within this range. After the desired adjustments have been made in the lateral spacing of the outer two snapping units in accordance with the widths of rows to be harvested, the coupling shafts 170 are positioned between the coupling sleeves 166 so as to be able to conduct drive between the snapping rolls and gathering chains of each of the outer pairs of snapping units, as previously described. In this regard, and as aforedescribed, a set of coupling shafts may be provided to increase the range of adjustment permitted.

In addition, the angular lateral inclination of the respective pairs of snapping rolls of each snapping unit may be adjusted as aforedescribed to accommodate crops of varying sizes and, additionally, to compensate for wear which may occur in the snapping roll mechanism. Thus, due to the coaction between the two bevel face driven gears 104 and the single double bevel faced drive gear 116 respectively associated with each pair of snapping rolls, the latter may be angled while the gears remain in meshing engagement.

After making the necessary adjustments in the spacing of the snapping units and the angular inclination of the snapping rolls as aforementioned, the header is propelled through a field of corn by the combine resulting in a given row of corn being received by each of the snapping units. The snapping rolls 100 in cooperation with stripper plates 132 snap the ears of corn from the stalks, and which ears are then conveyed by the gathering and elevating chains 148 into the cross auger 52 for feed to the elevating mechanism 22 and to the combine.

When the combine with its attached header undertakes the harvesting of another four row crop in which the row spacing may vary, it will now be appreciated that the snapping units may be adjusted as previously described in accordance with such spacing.

Therefore, it will now be appreciated that the header attachment of the present invention is particularly characterized by a novel mounting arrangement for a plurality of snapping units or harvesting units to accommodate variation in the widths of rows to be harvested, while the power drive to the respective units may be readily adjusted to accommodate the adjustment of the units themselves.

The enbodiments of the invention in which an exclusive property or priviliege is claimed are defined as follows:

[1. A harvesting attachment adapted to be removably mounted on a combine for simultaneously harvesting a plurality of spaced crop rows; said attachment comprising main frame means, a harvesting unit for each crop row, mounting means mounting said units in laterally spaced relation on said main frame means in accordance with the spacing of the crop rows, said mounting means for at least one of said units laterally adjustably mounting the latter relative to an adjacent unit to vary the lateral spacing therebetween, power operated means independent of said mounting means mounted on and laterally adjustable with respective ones of said adjacent units to drive the latter in any adjusted position thereof, means for conducting power to one of said power operated means, and coupling means adjustably drivingly coupling said one of said power operated means to the other thereof to transmit power therebetween while accommodating variation in the lateral spacing between said adjacent units.]

[2. The harvesting attachment according to claim 1 wherein said mounting means comprises bracket means carried by each of said units and engageable with said main frame means to mount said units thereon, and key means cooperable between said main frame means and each of said bracket means to space said units laterally relative to each other, said key means associated with said one of said units permitting adjustment of said bracket means of the latter laterally thereon to different positions.]

[3. The harvesting attachment according to claim 1 wherein said power operated means comprises a rotatable drive shaft mounted on respective ones of said adjacent units to drive the latter, and wherein said coupling means comprises a coupling shaft extending between said drive shafts, and means adjustably coupling said coupling shaft to said drive shafts to accommodate variation in the lateral spacing between said adjacent units.]

[4. The harvesting attachment according to claim 1 wherein said power operated means comprise a rotatable drive shaft mounted coaxially on respective ones of said adjacent units to drive the latter and wherein said coupling means comprises a coupling shaft extending coaxially between said drive shafts, and means demountably couling opposite ends of said coupling shaft to said drive shafts and permitting mounting of a second coupling shaft of a different length therebetween to accommodate variation in the lateral spacing between said adjacent units.]

[5. The harvesting attachment according to claim 1 further comprising a panel assembly extending laterally between said adjacent units and including a pair of panel members respectively mounted on said adjacent units, and means adjustably connecting said panel members for relative movement therebetween to accommodate variation in the lateral spacing of said adjacent units.]

[6. A combine corn header attachment for simultaneously harvesting a plurality of spaced rows of corn; said attachment comprising main frame means including a laterally extending support beam removably mountable on a combine, a plurality of snapping units, mounting means mounting said units in laterally spaced relation on said support beam in accordance with the spacing of the rows of corn, said mounting means for at least one of said units laterally adjustably mounting the latter relative to an adjacent unit to vary the lateral spacing therebetween, power operated means independent of said mounting means mounted on and laterally adjustable with respective ones of said adjacent units to drive the latter in any adjusted position thereof, means for conducting power to one of said power operated means, and coupling means adjustably drivingly coupling said one of said power operated means to the other thereof to transmit power therebetween while accommodating variation in the lateral spacing between said adjacent units.]

[7. The combine corn header attachment according to claim 6 wherein there are four of said snapping untis, at least the two outside units being laterally adjustable on said support beam relative to the respective adjacent units.]

[8. The combine corn header attachment according to claim 6 wherein said mounting means comprises bracket means carried by each of said units and engageable with said beam to mount said units thereon, and key means cooperable between said beam and each of said bracket means to space said units laterally relative to each other, said key means associated with said one of said units permitting adjustment of said bracket means of the latter laterally thereon to different positions.]

[9. The combine corn header attachment according to claim 6 wherein said mounting means comprises bracket means carried by each of said units and engageable with said beam to mount said units thereon, and key bar means fixedly secured to said beam and cooperable with said bracket means to space said respective units laterally relative to each other, said key bar means associated with said one of said units including a plurality of laterally spaced seats cooperable with said bracket means of said one of said units for adjustment of the latter to different positions laterally on said beam.]

[10. The combine corn header attachment according to claim 6 wherein said power operated means comprises a rotatable drive shaft mounted on respective ones of said adjacent units to drive the latter, and wherein said coupling means comprises a coupling shaft extending between said drive shafts, and means adjustably coupling said coupling shaft to said drive shafts to accommodate variation in the lateral spacing between said adjacent units.]

[11. The combine corn header attachment according to claim 6 wherein said power operated means comprises a rotatable drive shaft mounted coaxially on respective ones of said adjacent units to drive the latter, and wherein said coupling means comprises a coupling shaft extending coaxially between said drive shafts, and means demountably coupling opposite ends of said coupling shaft to said drive shafts and permitting mounting of a second coupling shaft of a different length therebetween to accommodate variation in the lateral spacing between said adjacent units.]

[12. The combine corn header attachment according to claim 6 wherein each of said units comprises a unit frame extending longitudinally forwardly from said beam, a pair of rotatable snapping rolls mounted longitudinally along each unit frame in side-by-side snapping relation, and wherein said power operated means comprises a pair of roll drive shafts respectively rotatably mounted on said adjacent unit frames and drivingly connected to said respective pairs of rolls carried thereby, and wherein said coupling means comprises a coupling shaft extending between said roll drive shafts, and means adjustably coupling said coupling shaft to said roll drive shafts to accommodate variation in the lateral spacing between said adjacent unit frames.]

[13. The combine corn header attachment according to claim 12 further comprising means mounting longitudinally spaced portions of each pair of said rolls for lateral angular adjustment relative to each other and their associated unit frame.]

14. [The combine corn header attachment according to claim 12] *A combine corn header attachment for simul-*

*taneously harvesting a plurality of spaced rows of corn; said attachment comprising main frame means including a laterally extending support beam removably mountable on a combine, a plurality of snapping units, mounting means mounting said units in laterally spaced relation on said support beam in accordance with the spacing of the rows of corn, said mounting means for at least one of said units comprising said one unit being mounted in abutting relationship to said beam to vertically support said one unit on said beam, said unit being movable along said beam in a continuous abutting vertically supporting relationship to vary the lateral spacing of said one unit relative to an adjacent unit and releasable clamping means carried by said one unit to fix said one unit in selected positions along said beam, power operated means independent of said mounting means mounted on and laterally adjustable with respective ones of said adjacent units to drive the latter in any adjusted position thereof, means for conducting power to one of said power operated means, and coupling means adjustably drivingly coupling said one of said power operated means to the other thereof to transmit power therebetween while accommodating variation in the lateral spacing between said adjacent units, each of said units comprises a unit frame extending longitudinally forwardly from said beam, a pair of rotatable snapping rolls mounted longitudinally along each unit frame in side-by-side snapping relation, and wherein said power operated means comprises a pair of roll drive shafts respectively rotatably mounted on said adjacent unit frames and drivingly connected to said respective pairs of rolls carried thereby, said coupling means comprising a coupling shaft extending between said roll drive shafts, and means adjustably coupling said coupling shaft to said roll drive shafts to accommodate variation in the lateral spacing between said adjacent unit frames, and* further comprising means mounting longitudinally spaced portions of each pair of said rolls for lateral angular adjustment relative to each other and their assocaited unit frame, and wherein said power operated means further comprises a driven gear carried by each of said rolls of said adjacent unit frames, and a driving gear carried by said respective roll drive shafts and engaging both of said driven gears of each of said pairs of said rolls to rotatably drive the latter in laterally adjusted positions thereof.

15. [The combine corn header attachment according to claim 12] *A combine corn header attachment for simultaneously harvesting a plurality of spaced rows of corn; said attachment comprising main frame means including a laterally extending support beam removably mountable on a combine, a plurality of snapping units, mounting means mounting said units in laterally spaced relation on said support beam in accordance with the spacing of the rows of corn, said mounting means for at least one of said units comprising said one unit being mounted in abutting relationship to said beam to vertically support said one unit on said beam, said unit being movable along said beam in a continuous abutting vertically supporting relationship to vary the lateral spacing of said one unit relative to an adjacent unit and releasable clamping means carried by said one unit to fix said one unit in selected positions along said beam, power operated means independent of said mounting means mounted on and laterally adjustable with respective ones of said adjacent units to drive the latter in any adjusted position thereof, means for conducting power to one of said power operated means, and coupling means adjustably drivingly coupling said one of said power operated means to the other thereof to transmit power therebetween while accommodating variation in the lateral spacing between said adjacent units, each of said units comprises a unit frame extending longitudinally forwardly from said beam, a pair of rotatable snapping rolls mounted longitudinally along each unit frame in side-by-side snapping relation, and wherein said power operated means comprises a pair of roll drive shafts respectively rotatably mounted on said adjacent unit frames and drivingly connected to said respective pairs of rolls carried thereby, said coupling means comprising a coupling shaft extending between said roll drive shafts, and means adjustably coupling said coupling shaft to said roll drive shafts to accommodate variation in the lateral spacing between said adjacent unit frame, and* further comprising a hood panel assembly extending laterally between said adjacent unit frames and including a pair of panel members respectively mounted on said adjacent unit frames, a snout panel assembly extending laterally between said adjacent unit frames and including a pair of snout panel members respectively mounted on said adjacent unit frames, and means respectively adjustably connecting said hood and snout panel members for relative movement therebetween to accommodate variation in the lateral spacing of said adjacent unit frames.

[16. The combine crorn header attachment according to claim 6 wherein each of said units comprises a unit frame extending longitudinally forwardly from said beam, a pair of rotatable snapping rolls mounted longitudinally along each unit frame in side-by-side snapping relation, and wherein said power operated means comprises a pair of roll drive shafts respectively rotatably mounted coaxially on said adjacent unit frames and drivingly connected to said respective pairs of rolls carried thereby, wherein said coupling means comprises a coupling shaft extending coaxially between said roll drive shafts, and means removably mounting opposite ends of said coupling shaft to said roll drive shafts and permitting replacement of said coupling shaft with a second coupling shaft of different length to accommodate variation in the lateral spacing between said adjacent unit frames.]

17. [The combine corn header attachment according to claim 6] *A combine corn header attachment for simultaneously harvesting a plurality of spaced rows of corn; said attachment comprising main frame means including a laterally extending support beam removably mountable on a combine, a plurality of snapping units, mounting means mounting said units in laterally spaced relation on said support beam in accordance with the spacing of the rows of corn, said mounting means for at least one of said units comprising said one unit being mounted in abutting relationship to said beam to vertically support said one unit on said beam, said unit being movable along said beam in a continuous abutting vertically supporting relationship to vary the lateral spacing of said one unit relative to an adjacent unit and releasable clamping means carried by said one unit to fix said one unit in selected positions along said beam, power operated means independent of said mounting means mounted on and laterally adjustable with respective ones of said adjacent units to drive the later in any adjusted position thereof, means for conducting power to one of said power operated means, and coupling means adjustably drivingly coupling said one of said power operated means to the other thereof to transmit power therebetween while accommodating variation in the lateral spacing between said adjacent units, and* wherein each of said units comprises a unit frame extending longitudinally forwardly from said beam, a pair of rotatable snapping rolls extending longitudinally along each unit frame in side-by-side snapping relation, a pair of gathering chains extending longitudinally along each unit frame in side-by-side relation above said rolls, and wherein said power operated means comprises a pair of roll drive shafts respectively rotatably mounted coaxially on said adjacent unit frames and drivingly connected to said respective pairs of rolls carried thereby, a pair of gathering chain drive shafts respectively rotatably mounted coaxially on said adjacent unit frames and drivingly connected to said respective pairs of gathering chains carried thereby, and wherein said coupling means comprises a pair of coupling shafts respectively extending coaxially between said roll drive and gathering chain drive shafts of said adjacent unit frames, and means adjustably axially coupling opposite ends of said respective coupling shafts to said roll drive and gathering chain drive shafts to accommodate variation in the lateral spacing between said adjacent unit frames.

18. [The combine corn header attachment according to claim 6] *A combine corn header attachment for simultaneously harvesting a plurality of spaced rows of corn; said attachment comprising main frame means including a laterally extending support beam removably mountable on a combine, a plurality of snapping units, mounting means mounting said units in laterally spaced relation on said support beam in accordance with the spacing of the rows of corn, said mounting means for at least one of said units comprising said one unit being mounted in abutting relationship to said beam to vertically support said one unit on said beam, said unit being movable along said beam in a continuous abutting vertically supporting relationship to vary the lateral spacing of said one unit relative to an adjacent unit and releasable clamping means carried by said one unit to fix said one unit in selected positions along said beam, power operated means independent of said mounting means mounted on and laterally adjustable with respective ones of said adjacent units to drive the latter in any adjusted position thereof, means for conducting power to one of said power operated means, and coupling means adjustably drivingly coupling said one of said power operated means to the other thereof to transmit power therebetween while accommodating variation in the lateral spacing between said adjacent units, and* wherein each of said units comprises a unit frame extending longitudinally forwardly from said beam, a pair of rotatable snapping rolls extending longitudinally along each unit frame in side-by-side snapping relation, a pair of gathering chains extending longitudinally along each unit frame in side-by-side relation above said rolls, and wherein said power operated means comprises a pair of roll drive shafts respectively rotatably mounted coaxially on said adjacent unit frames and drivingly connected to said respective pairs of rolls carried thereby, a pair of gathering chain drive shafts respectively rotatably mounted coaxially on said adjacent unit frames and drivingly connected to said respective pairs of gathering chains carried thereby, and wherein said coupling means comprises a pair of coupling shafts respectively extending coaxially between said roll drive and gathering chain drive shafts of said adjacent unit frames, and means removably mounting opposite ends of said respective coupling shafts to said roll drive and gathering chain drive shafts and permitting replacement of said coupling shafts with second coupling shafts of different length to accommodate variation in the lateral spacing between said adjacent unit frames.

19. [The combine corn header attachment according to claim 6] *A combine corn header attachment for simultaneously harvesting a pluraltiy of spaced rows of corn; said attachment comprising main frame means including a laterally extending support beam removably mountable on a combine, a plurality of snapping units, mounting means mounting said units in laterally spaced relation on said support beam in accordance with the spacing of the rows of corn, said mounting means for at least one of said units comprising said one unit being mounted in abutting relationship to said beam to vertically support said one unit on said beam, said unit being movable along said beam in a continuous abutting vertically supporting relationship to vary the lateral spacing of said one unit relative to an adjacent unit and releasable clamping means carried by said one unit to fix said one unit in selected positions along said beam, power operated means independent of said mounting means mounted on and laterally adjustable with respective ones of said adjacent units to drive the latter in any adjusted position thereof, means for conducting power to one of said power operated means, and coupling means adjustably drivingly coupling said one of said power operated means to the other thereof to transmit power therebetween while accommodating variation in the lateral spacing between said adjacent units, and* further comprising a panel assembly extending laterally between said adjacent units and including a pair of panel members respectively mounted on said adjacent units, and means adjustably connecting said panel members for relative movement therebetween to accommodate variation in the lateral spacing of said adjacent units.

[20. A harvesting attachment adapted to be removably mounted on a combine for simultaneously harvesting a plurality of spaced crop rows; said attachment comprising main frame means, a harvesting unit for each crop row, mounting means mounting said units in laterally spaced relation on said main frame means in accordance with the spacing of the crop rows, said mounting means for at least one of said units laterally adjustably mounting the latter relative to an adjacent unit to vary the lateral spacing therebetween, a panel assembly extending laterally between said adjacent units and including a pair of panel members respectively mounted on said adjacent units, and means adjustably connecting said panel members for relative lateral movement therebetween throughout their entire extents to accommodate variation in the lateral spacing of said adjacent units.]

21. A combine corn header attachement for simultaneously harvesting a plurality of spaced rows of corn; said attachement comprising main frame means removably mountable on a combine, a snapping unit for each row of corn, mounting means mounting said units in laterally spaced relation on said main frame means in accordance with the spacing of the rows of corn, said mounting means for at least one of said units laterally adjustably mounting the latter relative to an adjacent unit to vary the lateral spacing therebetween, *said mounting means for said one unit continuously supporting said one unit on said main frame means during variance of said lateral spacing,* a hood panel assembly extending laterally between said adjacent units including a pair of panel members respectively mounted on said adjacent units, a snout panel assembly extending laterally between said adjacent units and including a pair of snout panel members respectively mounted on said adjacent units, and means respectively adjustably connecting said hood and snout panel members for relative lateral movement therebetween throughout their entire extents to accommodate variation in the lateral spacing of said adjacent units.

22. The combine corn header attachment according to claim 21 wherein said panel members of said hood panel and snout panel assemblies are respectively pivotally connected to said adjacent units for swinging movement toward and away therefrom.

23. A snapping unit for the corn header of a combine, said snapping unit comprising a longitudinally extending frame, a pair of elongated snapping rolls extending longitudinally along said frame in side-by-side snapping relation, mounting means rotatably mounting longitudinally spaced portions of said rolls for lateral angular adjustment relative to each other and said frame, a driven gear carried by each of said rolls, and a single power driven driving gear engaging said driven gears to rotatably drive said rolls.

24. The snapping unit according to claim 23 wherein each of said driven gears is a bevel gear, and said driving gear is a double bevel gear the gear faces of which respectively mesh with the gear faces of said driven gears.

25. The snapping unit according to claim 23 wherein said mounting means comprises spherical bearing means adjacent said driven gears, and means adjustably mounted on said frame and supporting a portion of said rolls longitudinally spaced from said spherical bearing means to angularly adjust said rolls within said bearing means.

[26. A combine corn header attachment for simultaneously harvesting a plurality of spaced rows of corn; said attachment comprising main frame means including a laterally extending support beam removably mountable on a combine, a plurality of snapping units, mounting means mounting said units in laterally spaced relation on said support beam in accordance with spacing of the rows of corn, said mounting means for at least one of said units laterally adjustably mounting the latter relative to an adjacent unit to vary the lateral spacing therebetween, power operated means for driving said units and including adjustable drive means interconnecting said adjacent units to accommodate variation in the lateral spacing therebetween, said mounting means comprising bracket means carried by each of said units and engageable with said beam to mount said unit thereon, and key means cooperable between said beam and each of said bracket means to space said units laterally relative to each other, said key means associated with said one of said units permitting adjustment of said bracket means of the latter laterally thereon to different positions.]

[27. A combine corn header attachment for simultaneously harvesting a plurality of spaced rows of corn; said attachment comprising main frame means including a laterally extending support beam removably mountable on a combine, a plurality of snapping units, mounting means mounting said units in laterally spaced relation on said support beam in accordance with spacing of the rows of corn, said mounting means for at least one of said units laterally adjustably mounting the latter relative to an adjacent unit to vary the lateral spacing therebetween, power operated means for driving said units and including adjustable drive means interconnecting said adjacent units to accommodate variation in the lateral spacing therebetween, said mounting means comprising bracket means carried by each of said units and engageable with said beam to mount said units thereon, and key bar means fixedly secured to said beam and cooperable with said bracket means to space said respective units laterally relative to each other, said key bar means associated with said one of said units including a plurality of laterally spaced seats cooperable with said bracket means of said one of said units for adjustment of the latter to different positions laterally on said beam.]

[28. A combine corn header attachment for simultaneously harvesting a plurality of spaced rows of corn; said attachment comprising main frame means including a laterally extending support beam removably mountable on a combine, a plurality of snapping units, mounting means mounting said units in laterally spaced relation on said support beam in accordance with the spacing of the rows of corn, said mounting means for at least one of said units laterally adjustably mounting the latter along said support beam and relative to an adjacent unit to vary the lateral spacing therebetween, and means independent of said mounting means for driving said units.]

[29. The combine corn header attachment according to claim 28 wherein there are four of said snapping units, at least the two outside units being laterally adjustable on said support beam relative to the respective adjacent units.]

[30. The combine corn header attachment according to claim 28 wherein said mounting means for said one of said units fixedly secures the latter laterally relative to said support beam in any adjusted position of said unit.]

[31. The combine corn header attachment according to claim 28 wherein said mounting means for said one of said units fixedly secures the latter laterally and vertically relative to said support beam in any adjusted position of said unit.]

[32. The combine corn header attachment according to claim 28 wherein each of said units comprises a unit frame extending longitudinally forwardly from said support beam, a pair of rotatable snapping rolls extending longitudinally along each unit frame in side-by-side snapping relation, a pair of gathering chains extending longitudinally along each unit frame in side-by-side relation above said rolls, and wherein said mounting means fixedly secures said units laterally and vertically relative to said support beam.]

[33. The combine corn header attachment as defined in claim 32 further comprising cross auger means adjacent the ends of said units mounted on said support beam to receive and collect at a common discharge area thereof corn harvested simultaneously by all of said units.]

[34. The combine corn header attachment according to claim 28 wherein said snapping units include rotatable snapping means and driven gathering means, said means for driving said units providing power drive from the combine to both the snapping means and the gathering means of each unit in any laterally adjusted position of the unit on said support beam.]

[35. The combine corn header attachment according to claim 34 wherein said rotatable snapping means comprises a pair of rotatable snapping rolls carried by said unit in side-by-side snapping relation and said driven gathering means comprises a pair of gathering chains carried by said unit in side-by-side relation adjacent to said rolls.]

[36. The combine corn header attachment according to claim 34 wherein said snapping units include rotatable snapping means and driven gathering means, said means for driving said units including driving means parallel to said support beam to provide power drive from the combine to both the snapping means and the gathering means of each unit in any laterally adjusted position of the unit on said support beam.]

References Cited

The following references, cited by the Examiner, are of record in the patented file of this patent or the original patent.

UNITED STATES PATENTS

| | | | |
|---|---|---|---|
| 888,411 | 5/1908 | Suhr | 56—105 |
| 1,390,159 | 9/1921 | Price | 56—59 |
| 1,936,760 | 11/1933 | Hitchcock | 56—18 |
| 2,209,056 | 7/1940 | Hyman | 56—112 |
| 3,070,939 | 1/1963 | Schwartz | 56—18 |
| 3,174,266 | 3/1965 | Hoekseme | 56—106 |

FOREIGN PATENTS

| | | | |
|---|---|---|---|
| 1,268,615 | 6/1961 | France | 56—105 |

ANTONIO, F. GUIDA, Primary Examiner